United States Patent
Suzuki

(10) Patent No.: US 8,547,602 B2
(45) Date of Patent: Oct. 1, 2013

(54) IMAGE PROCESSING APPARATUS AND CONTROL METHOD THEREOF

(75) Inventor: Katsunari Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 12/938,010

(22) Filed: Nov. 2, 2010

(65) Prior Publication Data

US 2011/0134489 A1 Jun. 9, 2011

(30) Foreign Application Priority Data

Dec. 4, 2009 (JP) .................................. 2009-277038

(51) Int. Cl.
*H04N 1/40* (2006.01)

(52) U.S. Cl.
USPC ............................. 358/448; 382/284; 358/450

(58) Field of Classification Search
USPC .................................. 358/448, 450; 382/284
See application file for complete search history.

(56) References Cited

U.S. PATENT DOCUMENTS

| | | | |
|---|---|---|---|
| 5,850,478 A | 12/1998 | Suzuki et al. | |
| 6,072,941 A | 6/2000 | Suzuki et al. | |
| 6,292,593 B1 * | 9/2001 | Nako et al. | 382/284 |
| 6,456,803 B2 | 9/2002 | Suzuki et al. | |
| 6,570,671 B1 | 5/2003 | Yamaguchi et al. | |
| 6,739,772 B2 | 5/2004 | Suzuki et al. | |
| 2009/0284584 A1 * | 11/2009 | Wakabayashi et al. | 348/44 |

FOREIGN PATENT DOCUMENTS

JP 2006-171864 6/2006

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

An image processing apparatus is provided. The apparatus includes a storage unit for storing image data; a readout unit for reading out the image data from the storage unit, while dividing the image data into a plurality of image data; image processing units for respectively performing image processing on the image data read out by the readout unit; an image combining unit for combining the received image data after deleting an unnecessary pixel; a control unit for shifting the plurality of image data, instructing the readout unit to read out image data to include an overlapping region such that the plurality of image data partially overlap each other, and instructing the image combining unit to delete the unnecessary pixel according to the shift; and an output unit for outputting the image data combined by the image combining unit.

8 Claims, 16 Drawing Sheets

FIG. 5
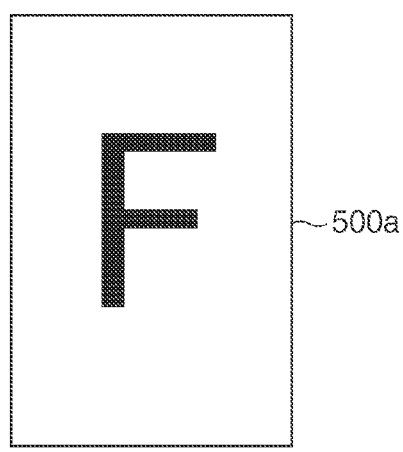
500a
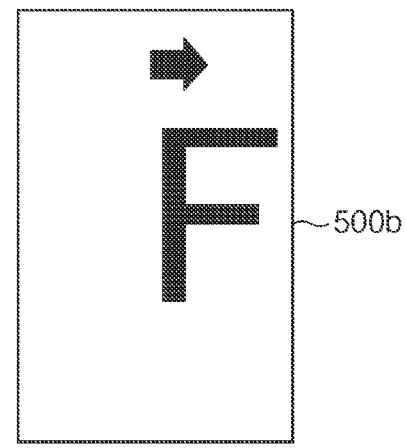
500b
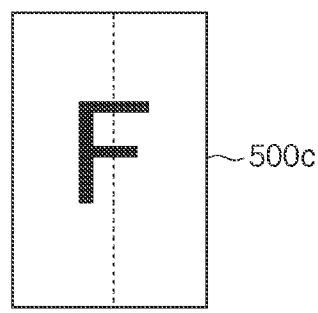
500c
500d
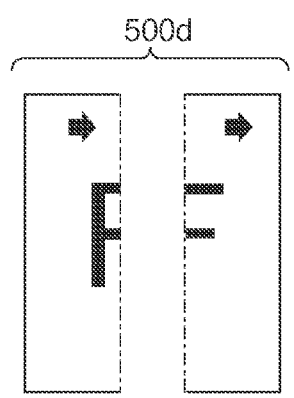
500e
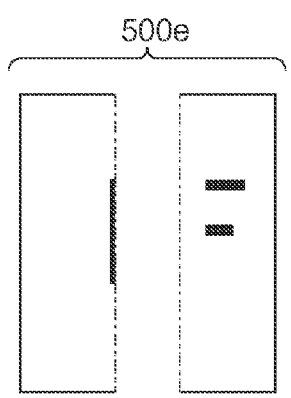
500f
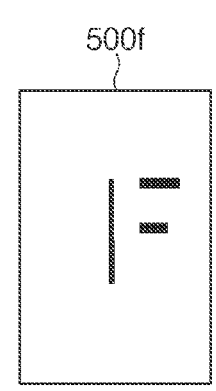

FIG. 7
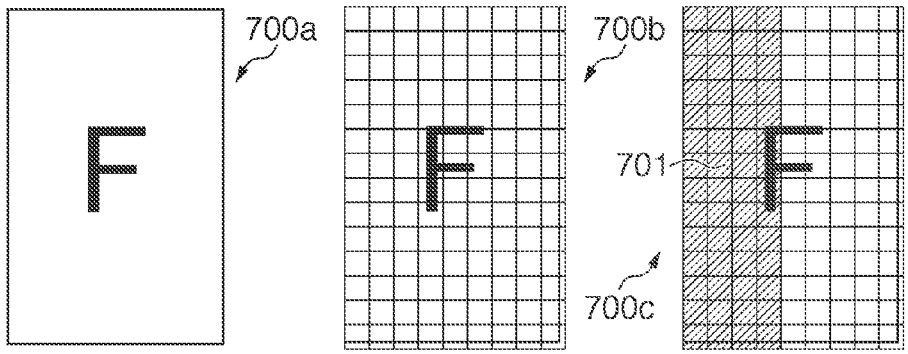
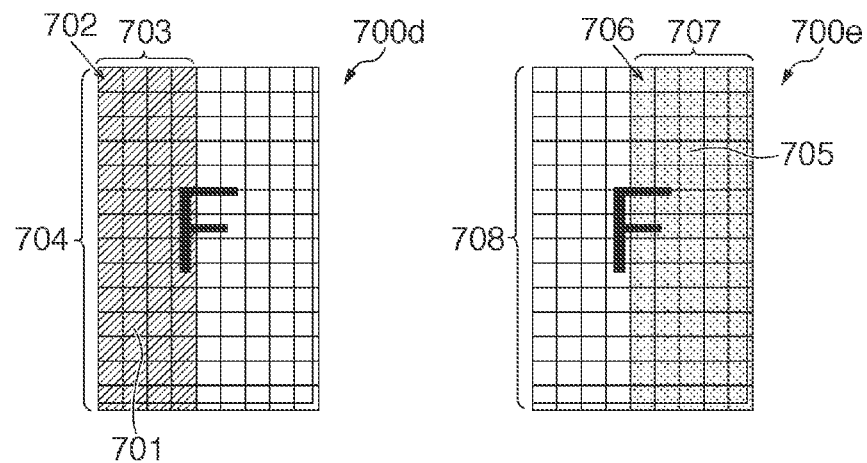
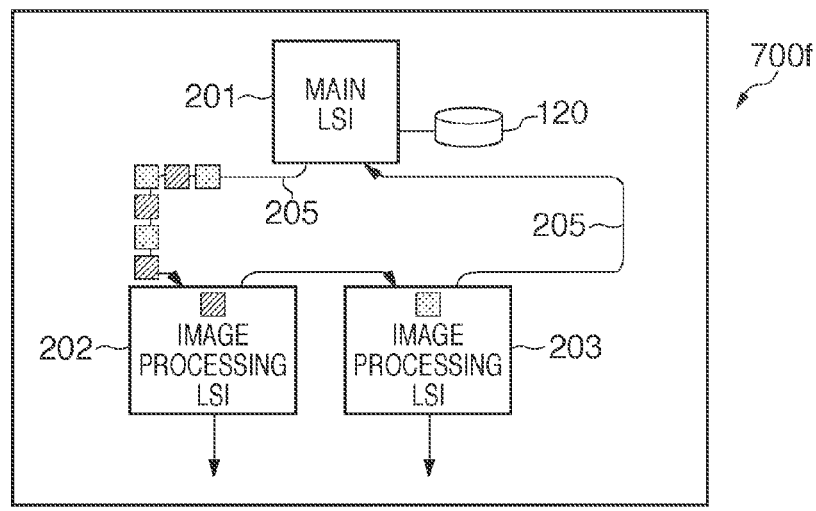

FIG. 12
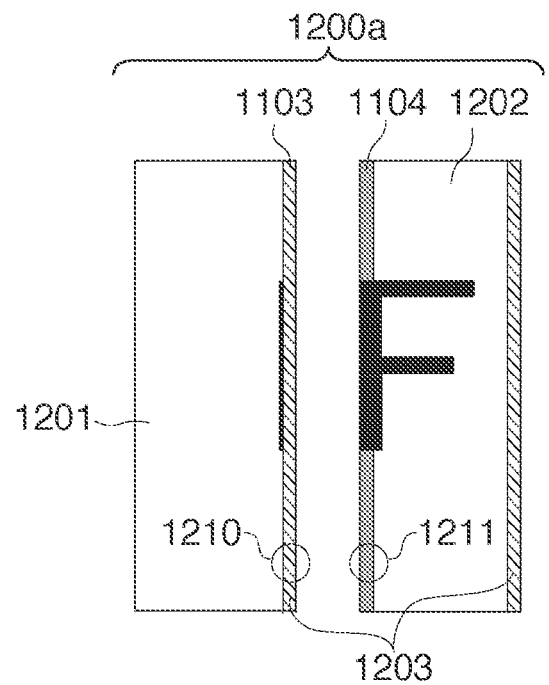
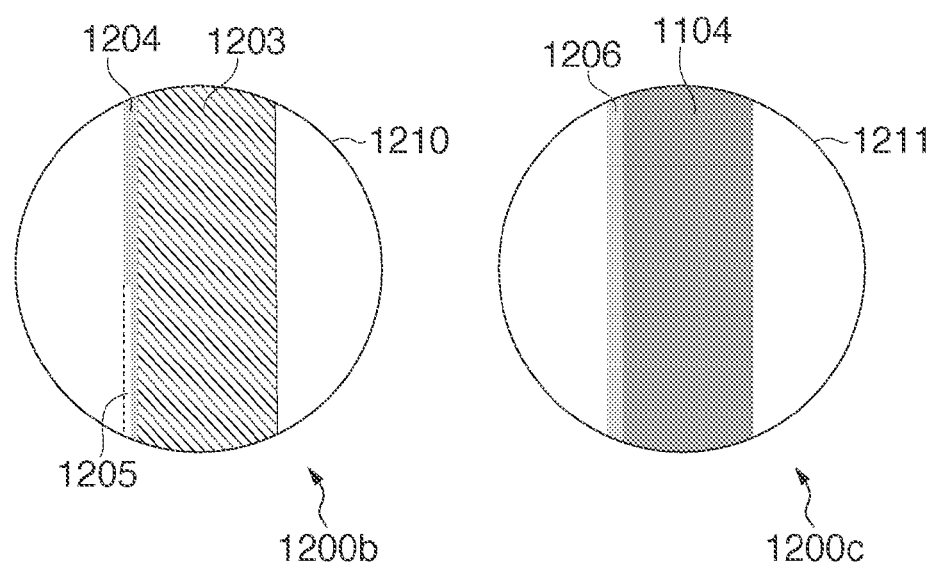

FIG. 16
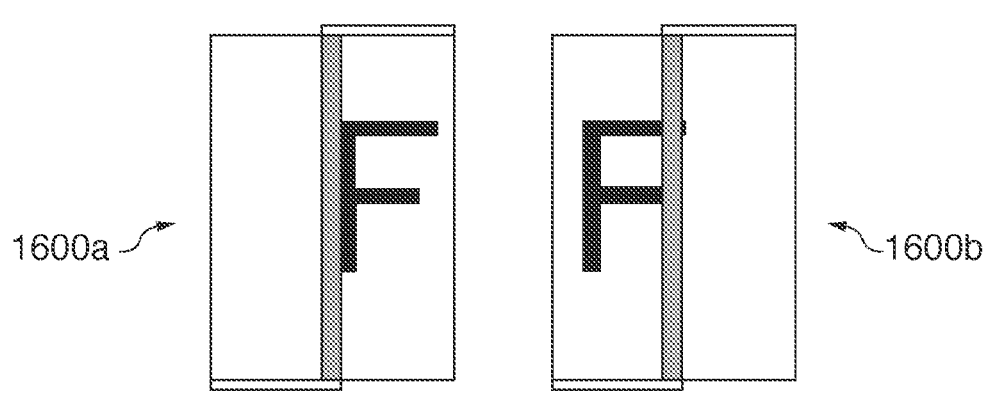
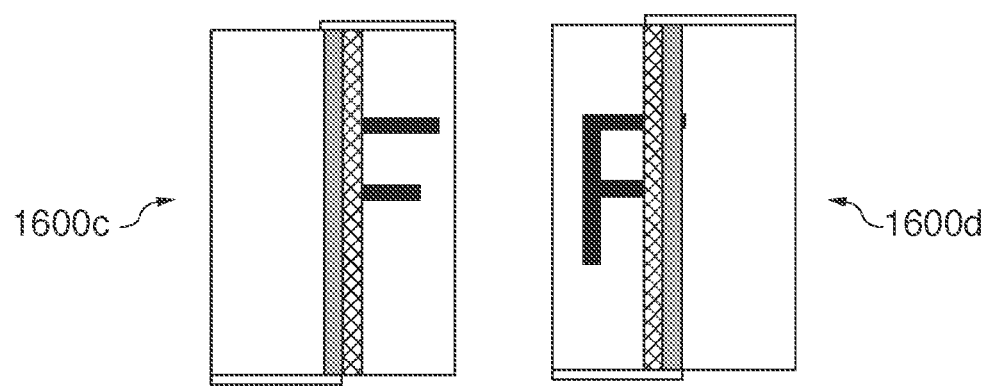
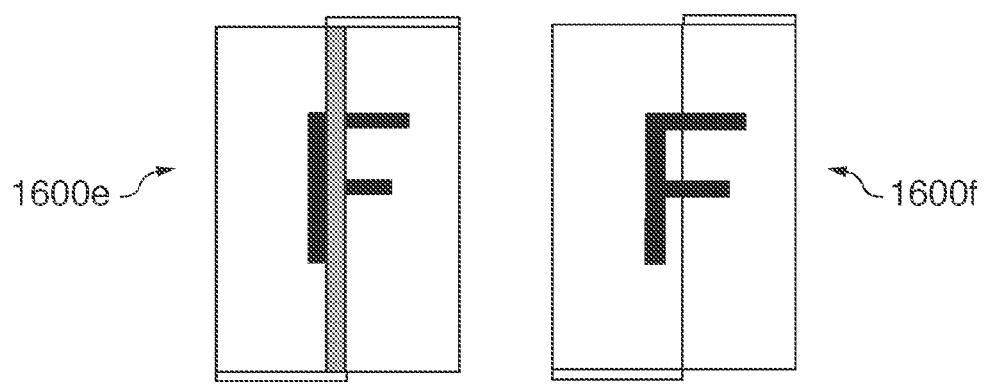

IMAGE PROCESSING APPARATUS AND CONTROL METHOD THEREOF

BACKGROUND OF THE INVENTION

1. Field of the Invention

The present invention relates to an image processing apparatus for processing image data in parallel with a plurality of image processing units, and combining and outputting the processing results, and to a control method thereof.

2. Description of the Related Art

With conventional image processing that involves reading, image processing and printing an original document, image data obtained by reading the original document is processed by a single image processing unit. Meanwhile, as an image processing apparatus for processing high resolution image data at high speed, it is proposed to divide the image data of an original document into a plurality of sections (region division), and process these divided pieces of image data in parallel with a plurality of image processing units (Japanese Patent Laid-Open No. 2006-171864).

The above conventional image processing units perform image processing that involves shifting image data in a main scanning direction and is dependent on positioning in the main scanning direction. Also, an apparatus that performs image processing in parallel using a plurality of image processing units will require an image combining unit for restoring the plurality of divided image data that have been processed to the original image. In this case, if a plurality of image processing units respectively perform image processing on image data that has been divided and transferred, correct position information corresponding to the original image before being divided will not be provided for the divided image data. A unit for shifting image data in the main scanning direction and a unit for performing image processing dependent on positioning in the main scanning direction are thus mounted in the image combining unit. A shift in the main scanning direction and image processing dependent on positioning in the main scanning direction need to be performed after combining the image data with this image combining unit and obtaining the correct position information of the original image.

However, with such an image processing apparatus, the unit for performing a shift in the main scanning direction and the unit for performing image processing dependant on positioning in the main scanning direction need to be mounted redundantly in both the image processing unit and the image combining unit. Thus, there is a problem in terms of the increased cost of the overall system.

SUMMARY OF THE INVENTION

The present invention solves the above problems with the conventional technology. An aspect of the present invention provides a technique that is able to realize image processing that includes shifting with a relatively simply configuration and at a low cost, in the case of processing image data in parallel with a plurality of image processing units, and combining and outputting the processing results.

According to one aspect of the present invention, an image processing apparatus comprises: a storage unit configured to store image data; a readout unit configured to read out the image data from the storage unit, while dividing the image data into a plurality of image data; a plurality of image processing units configured to respectively perform image processing on the image data read out by the readout unit; an image combining unit configured to receive the plurality of processed image data processed by the plurality of image processing units, and combine the received image data after deleting an unnecessary pixel; a control unit configured to, if the image processing by the plurality of image processing units includes shifting image data, shift the plurality of image data, instruct the readout unit to read out image data to include an overlapping region such that the plurality of image data partially overlap each other, and instruct the image combining unit to delete the unnecessary pixel according to the shift; and an output unit configured to output the image data combined by the image combining unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates exemplary shifting for moving image data in a main scanning direction.

FIG. 7 illustrates a left-right division structure of image data.

FIG. 12 illustrates an example in which image division/transfer is performed on an image obtained by shifting an original image in tile units and performing a further shift in pixel units in another embodiment.

FIG. 16 illustrates an exemplary image shift.

DESCRIPTION OF THE EMBODIMENTS

Hereinafter, embodiments of the present invention will be described in detail with reference to the accompanying drawings. The following embodiments are not intended to limit the claims of the present invention, and not all combinations of features described in the embodiments are essential for the present invention.

Figure 1:
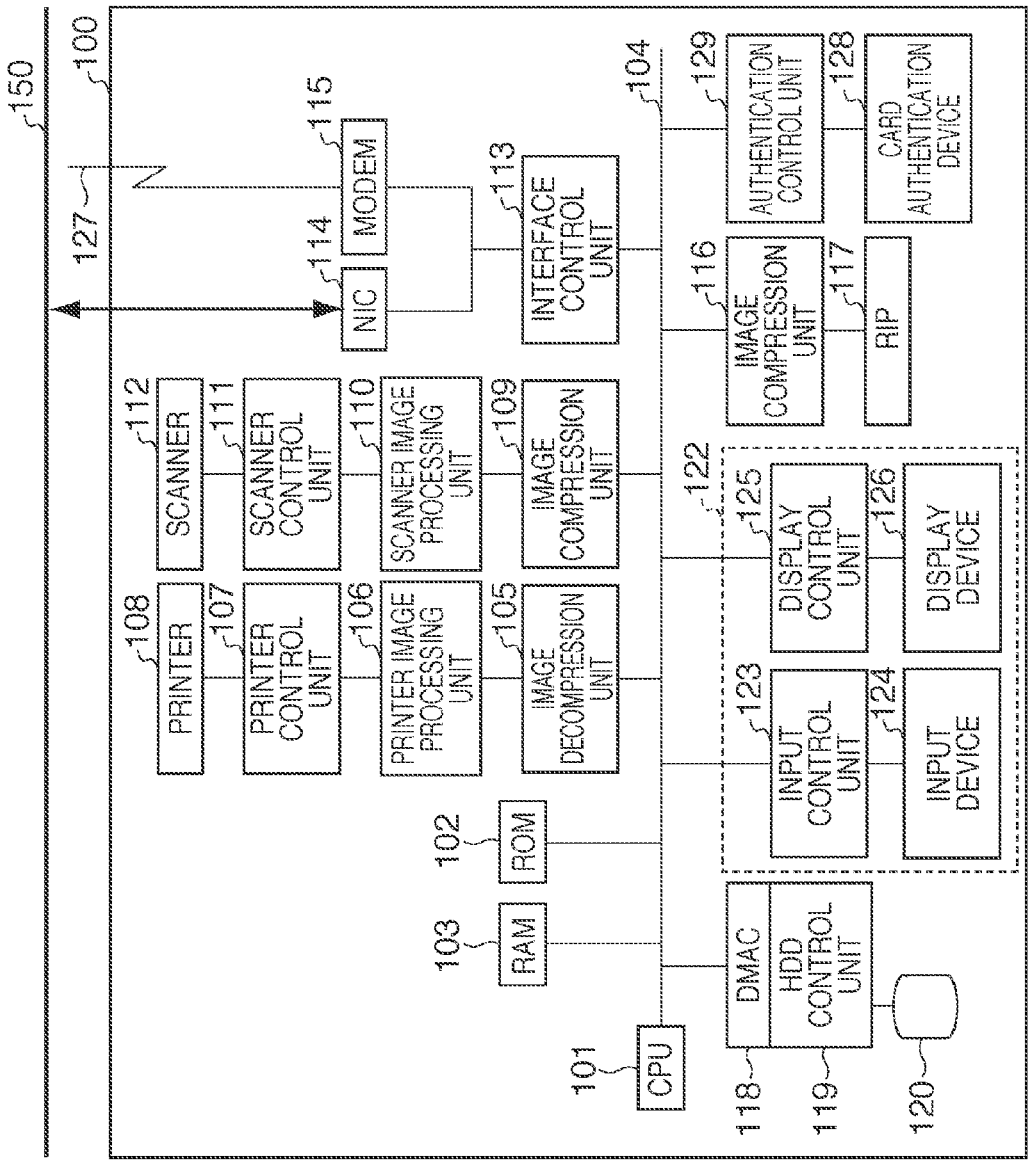
FIG. 1 is a block diagram showing an exemplary configuration of a multifunction peripheral (MFP) according to an embodiment.

FIG. 1 is a block diagram showing an exemplary configuration of a multifunction peripheral (MFP) 100 that serves as an image processing apparatus according to an embodiment of the present invention. A CPU 101 functions as a control unit that controls the entire MFP 100. The CPU 101 reads out and boots an OS (operating system) stored in an HDD (hard disk drive) 120 using a boot program stored in a ROM 102 when the MFP 100 is powered on. The CPU 101 loads a control program and various types of application programs stored in the HDD 120 into a RAM 103, and runs the loaded programs on the OS. The CPU 101 is connected to the components by a system bus 104. The RAM 103 is used as a main memory for storing programs currently being run by the CPU 101, and is further used as a temporary storage area such as a work area, as well as a temporary storage area for image data.

An interface control unit 113 transmits and receives various data including image data to and from a network such as a LAN 150, by controlling an NIC (network interface card) 114. The interface control unit 113 also transmits and receives data to and from a public line 127, by controlling a modem 115. An HDD control unit 119 controls access to the HDD 120. This HDD 120 stores various data such as the control program for controlling the entire system, application programs and image data. The HDD 120 can also be accessed from the CPU 101 or another device on the LAN 150 via the NIC 114 and the interface control unit 113. Also, a DMAC 118 can write image data placed in the RAM 103 directly to the HDD 120, or read out image data on the HDD 120 directly to the RAM 103.

A scanner control unit 111 reads an original document by controlling a scanner 112, and acquires the read image data of the original document. The scanner 112 reads an image of the original document using an optical reading device such as a CCD, and converts the image to a corresponding image signal. A scanner image processing unit 110 performs image processing, such as color space processing and filtering, on image data from the scanner 112. An image compression unit 109 compresses image data processed by the scanner image processing unit 110. Image data thus compressed is initially stored in the RAM 103, and then saved to the HDD 120 via the DMAC 118 and the HDD control unit 119.

A raster image processor (RIP) 117 expands PDL data received from the LAN 150 into a bitmap image. An image compression unit 116 compresses the bitmap image data extended by the RIP 117. Here, the compressed image data is initially stored in the RAM 103, and then saved to the HDD 120 via the DMAC 118 and the HDD control unit 119. The size of the image data compressed by the image compression units 109 and 116 is managed by the CPU 101 in units of jobs or pages, and this information is stored in the RAM 103 in association with the image data.

A printer control unit 107 prints image data onto a recording medium such as paper by controlling a printer 108. When printing image data, image data stored in the HDD 120 is transferred to the RAM 103, and subsequently decompressed by an image decompression unit 105 and sent to a printer image processing unit 106. The printer image processing unit 106 executes color conversion, halftone processing and the like on the image data in accordance with the printing method of the printer 108. For example, the printer 108 prints an image on a sheet serving as a recording medium. This printer 108 is a printer unit using an electrophotographic system, inkjet system or the like.

An operation unit 122 is equipped with an input control unit 123, an input device 124, a display control unit 125, and a display device 126. The input control unit 123 inputs operation instructions given by a user from the input device 124, which is a touch panel, hard key or the like. The display control unit 125 displays an operation screen for the user to input various instructions, by controlling the display device 126, which is a liquid display screen, CRT or the like. An authentication control unit 129 controls a card authentication device 128. The card authentication device 128 reads an ID card on which user information is recorded. The data on an ID card thus read is managed by the CPU 101, and used as permission to use the MFP 100, information for managing data stored in the HDD 120, and the like.

The processing flow in the case where, for example, an original document is copied with the above configuration will be briefly described. The user sets an original document to be copied on the scanner 112. The user then configures the necessary operational settings for a copy operation with the operation unit 122. These settings include transitioning to copy mode, the number of copies, and the processing content for when a copy is made. At this time, input information is displayed on the display device 126 of the operation unit 122. The copy operation is started when the user presses a copy start button of the operation unit 122. The original document is thereby read by the scanner 112, and the image data of the original document is transferred via the scanner control unit 111, the scanner image processing unit 110, the image compression unit 109, the system bus 104, the DMAC 118 and the HDD control unit 119 in the stated order to the HDD 120 and stored therein. Compressed image data stored in the HDD 120 is thus read out and decompressed by the image decompression unit 105, after which image processing that depends on the copy settings configured by the operation unit 122 is performed by the printer image processing unit 106. Image data thus image processed is sent to the printer 108 via the printer control unit 107 and printed.

Figure 2:
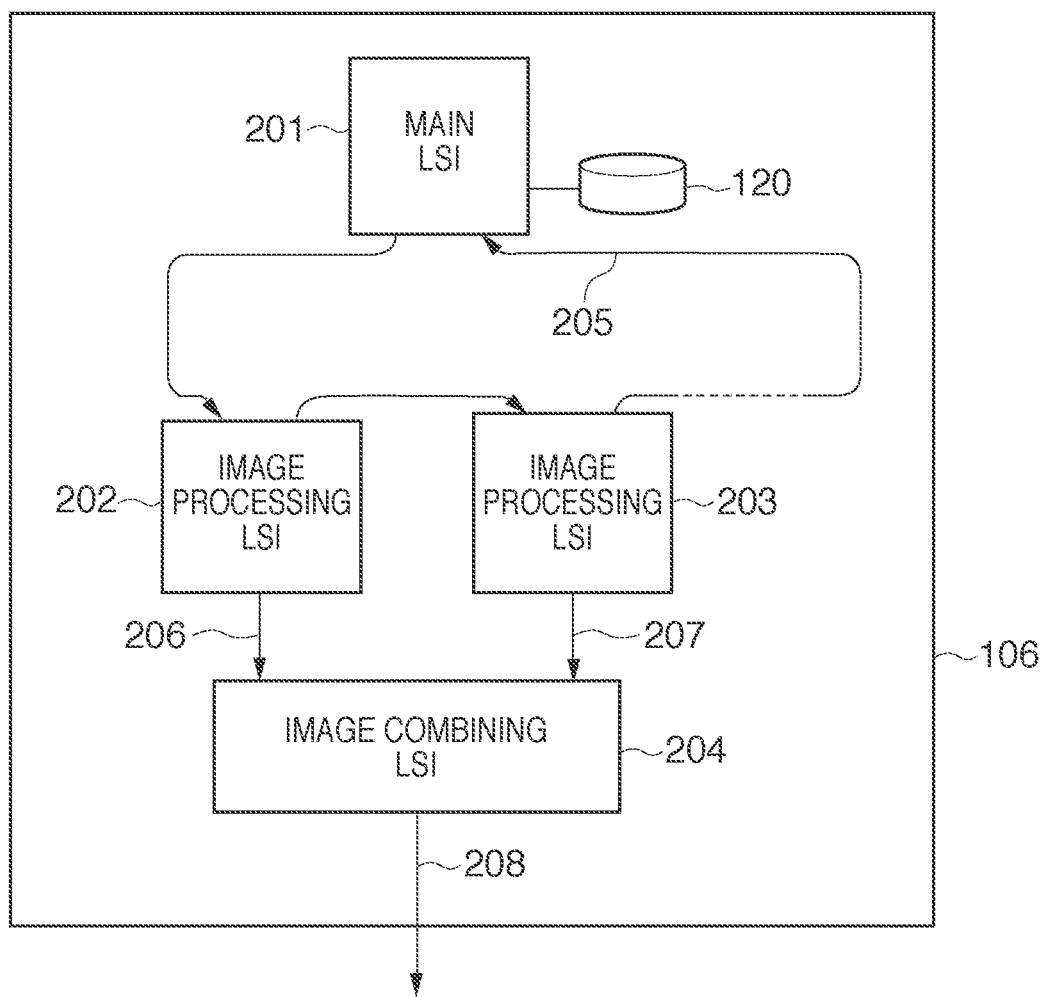
FIG. 2 is a block diagram showing an exemplary configuration in which an image processing unit of the MFP according to the embodiment is constituted by a plurality of LSIs.

FIG. 2 is a block diagram showing an exemplary configuration in which an image processing unit for executing image processing in the MFP 100 according to a First Embodiment is constituted by a plurality of LSIs. Here, the case where the image processing unit is the printer image processing unit 106 for processing image data to be output to the printer 108 will be described, but this image processing unit can also be applied to the scanner image processing unit 110 for processing image data input from the scanner 112.

A main LSI 201 includes the CPU 101, the DMAC 118 and the like for handling image data and setting data and for controlling the operations of the MFP 100. Image processing LSIs 202 and 203 are image processing units whose various operating parameters are configured by the setting data, and that perform image processing on input image data. Here, the image processing LSIs 202 and 203 have the same configuration. An image combining LSI 204 receives image data processed by the image processing LSIs 202 and 203, combines this image data, and outputs the combined image data to the printer control unit 107. An image ring bus 205 connects the main LSI 201 and the image processing LSIs 202 and 203, and is used in transferring image data and setting data output from the main LSI 201 to the image processing LSIs 202 and 203. An image data bus 206 connects the image processing LSI 202 and the image combining LSI 204, and an image data bus 207 connects the image processing LSI 203 and the image combining LSI 204. A bus 208 connects the image combining LSI 204 and the printer control unit 107.

Figure 3:
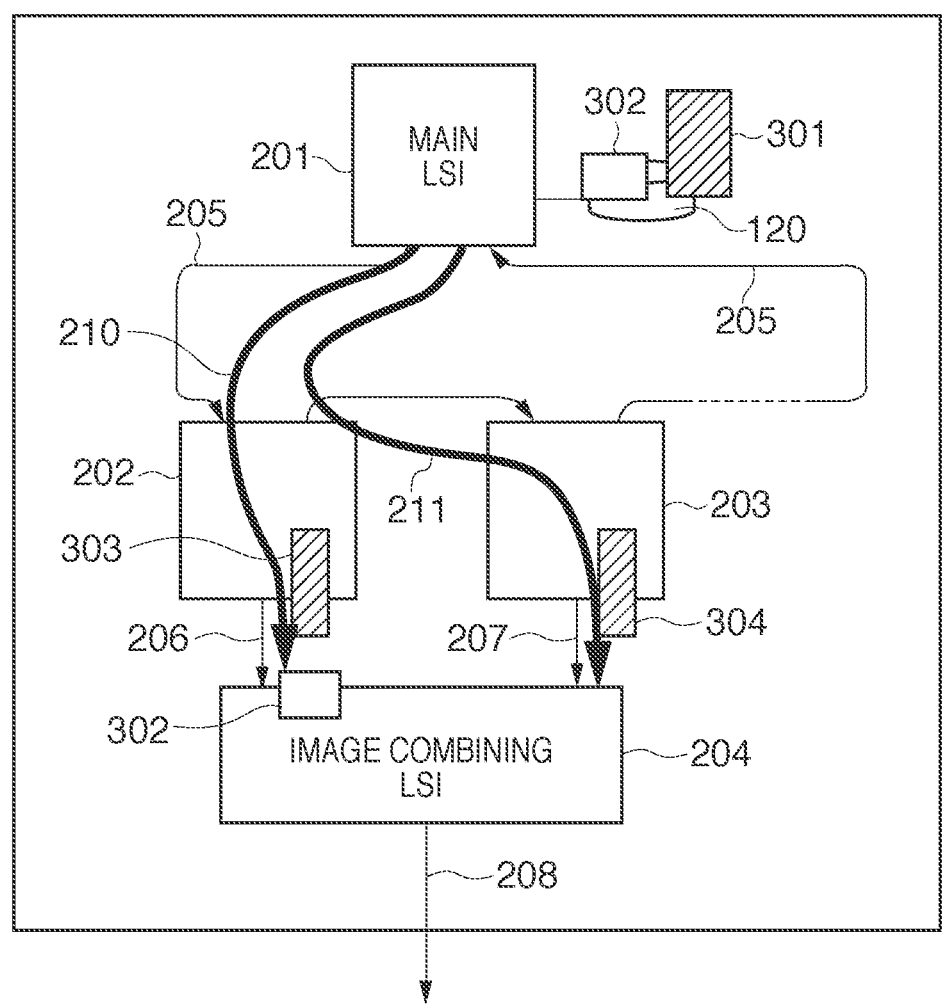
FIG. 3 illustrates an exemplary flow of image data in the image processing unit of FIG. 2.

FIG. 3 illustrates an exemplary flow of image data in the printer image processing unit 106 of FIG. 2. Parts common to FIG. 2 are denoted with the same reference numerals, and a description thereof will be omitted. In FIG. 3, reference numeral 301 denotes one page of image data. Reference numeral 302 denotes setting data used for configuring the processing content of the image combining LSI 204. Reference numerals 303 and 304 denote image data obtained by dividing the page of image data 301, and are respectively the left half and right half of the page of image data 301. Here, the page of image data 301 is compressed with a compression method such as JPEG, and decompression is performed by the image decompression unit 105 prior to image processing being performed by the image processing LSIs 202 and 203. In the case where the image processing unit is the scanner image processing unit 110, decompression is unnecessary, since a page of image data read by the scanner 112 is input.

Reference numerals 210 and 211 denote, respectively, first and second data paths for transferring the setting data 302 from the main LSI 201 to the image combining LSI 204 via the image processing LSIs 202 and 203. Although not shown, there is also setting data for configuring the processing content of the image processing LSIs 202 and 203, and this data is also sent to each image processing LSI via the first and second data paths 210 and 211 and set therein.

Figure 4:
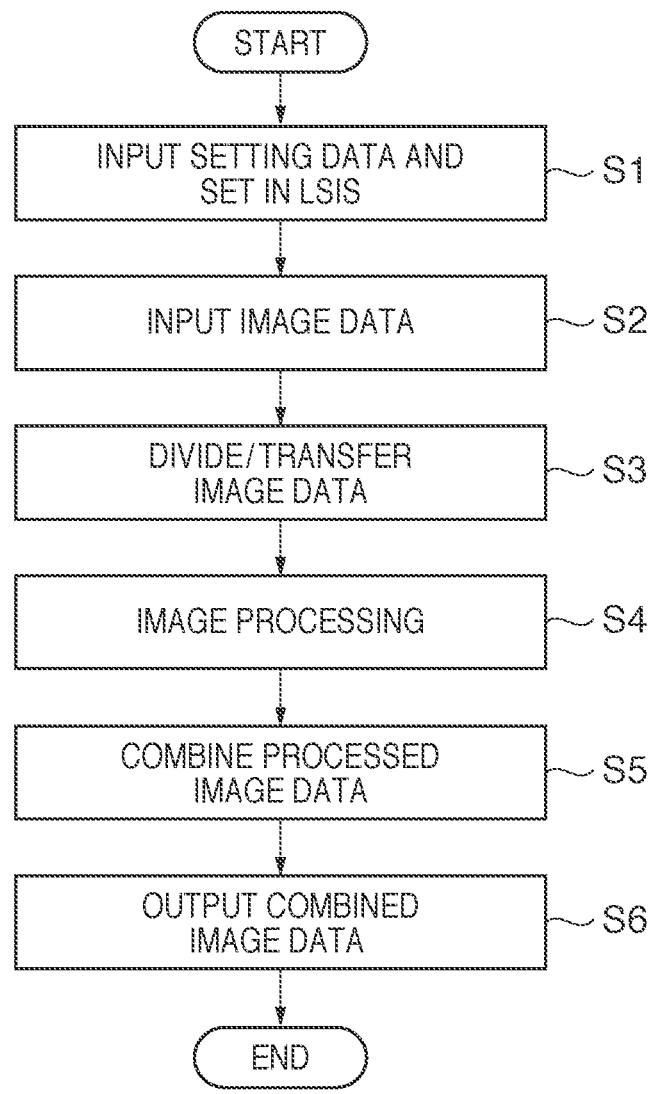
FIG. 4 is a flowchart illustrating an exemplary processing flow in the image processing unit of FIG. 3.

FIG. 4 is a flowchart illustrating an exemplary flow of processing in the image processing unit of FIG. 3. Firstly, at S1, setting data 302 for configuring the processing content of the image processing LSIs 202 and 203 and the image combining LSI 204 is input based on setting information input from the operation unit 122, and is set in the corresponding LSIs. Next, the processing proceeds to S2, where image data is input from the scanner 112 or the HDD 120. The main LSI 201 checks information such as the image size and attribute information of the image data. Next, the processing proceeds to S3, where the image data input at S2 is divided and transferred to the image processing LSIs 202 and 203. Here, this image data is divided into left and right halves, with reference to the setting data and the image size and attribute information of the image data. The image data thus divided is transferred to the bus 205 as left and right image data. Also, when transferring this divided image data, information indicating the transfer destination is attached to each piece of divided image data. Next, processing proceeds to S4, where the divided image data is processed in parallel by the image processing LSIs 202 and 203. Here, various types of correction processing, such as color conversion and gamma conversion, rotation processing, and the like, are performed, for example. Next, the processing proceeds to S5, where the image data processed in parallel is sent to the image combining LSI 204 and combined, thereby being restored to the original page of image data. The processing then proceeds to S6, where the image data thus combined is transferred to the bus 208 and printed by the printer 108. In the case where the image processing unit is the scanner image processing unit 110, the page of combined image data is sent to the image compression unit 109 and compressed.

Next, a problem in the case where a shift in the main scanning direction is performed on divided image data will now be described. FIG. 5 illustrates exemplary shifting for moving image data in the main scanning direction. Reference numeral 500a denotes an image of original image data. Reference numeral 500b denotes the image after being shifted in the case where the original image data is moved (shifted) in the main scanning direction. With a conventional image shift, the shift is performed on image data that had undergone various types of image processing, in the case where such a shift is performed in the main scanning direction. However, with the image processing unit used in the present embodiment shown in FIG. 2, the conventional shifting method cannot be used. For example, in the case where a shift in the main scanning direction is performed after various image processing has been performed by the image processing LSIs 202 and 203, the image shift in the main scanning direction is performed on each divided image, such as shown by reference numerals 500d to 500f. It is thus conceivable that the final image data will end up fragmented.

Reference numeral 500c denotes an image of the original image data, and here the image data divided into left and right halves is respectively processed by the image processing LSIs 202 and 203. Reference numeral 500d denotes the image data thus divided. Reference numeral 500e denotes the case where these pieces of divided image data are shifted in the main scanning direction by an image shifting unit after undergoing image processing by the image processing LSIs 202 and 203. In 500e, part of the image data on the left side ends up outside the area as a result of this shift. Part of the image is thus lost with the image data on the left side of 500e, whereas with the image data on the right side, the image data of the shifted part is not compensated for, so the shifted section is output as a blank image, for example. When these pieces of divided image data are combined, the original image data cannot be restored as shown in 500f.

To prevent this, it is also conceivable to perform the shift after the divided image data has been combined by the image combining LSI 204 to form the original image data, after image processing has been respectively performed on the divided data by the image processing LSIs 202 and 203. However, in that case, the image combining LSI 204 needs enough memory to at least store one page of image data, resulting in a cost increase.

Accordingly, in the present embodiment, a technique enabling the original image data to be restored after shifting divided image data without needing a large-capacity image memory is proposed. In the First Embodiment, this technique is described in the case of a copy operation being performed to facilitate description, but this technique can also be applied to the case where, for example, PDL data from a PC is expanded and printed.

Firstly, in the case where a copy operation is instructed by the user, the CPU 101 reads the instructed information and, using software stored in the RAM 103, automatically sets the image processing content to be used for the copy operation. Here, this instructed information includes the number of pixels to be shifted and shift direction information in order to shift the image data in the main scanning direction. Also, the content of image processing which refers peripheral pixels is extracted out of the instructed image processing, the number of peripheral pixels to be used in the image processing is determined, and the number of unnecessary pixels produces as a result is determined.

Figure 6:
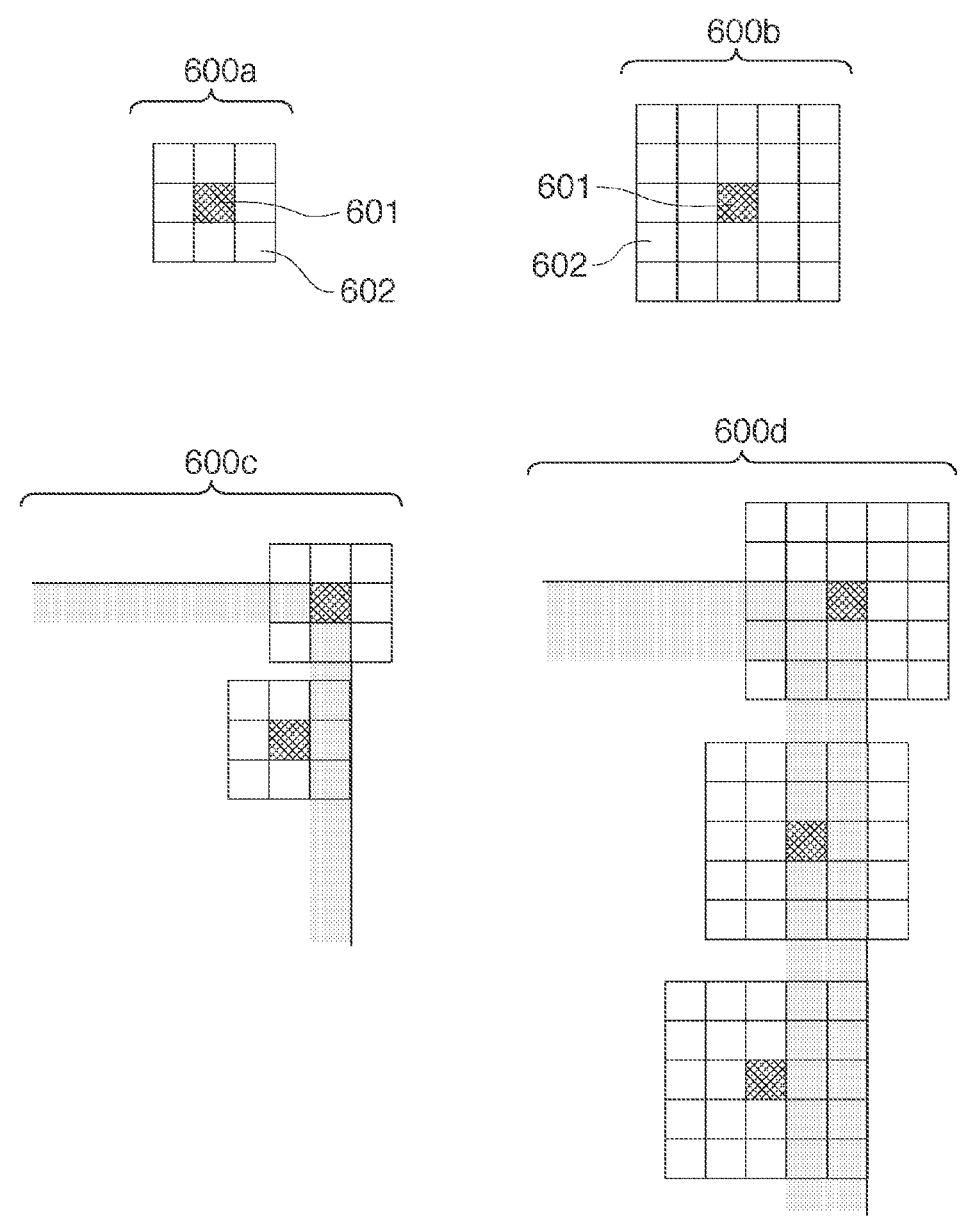
FIG. 6 defines a pixel of interest and peripheral pixels.

FIG. 6 defines a pixel of interest and peripheral pixels. Reference numeral 600a denotes the case where there are 3×3 peripheral pixels 602 that will be referenced centered on the pixel of interest 601, and reference numeral 600b denotes the case where there are 5×5 peripheral pixels 602 that will be referenced centered on the pixel of interest 601. In the case of 3×3 pixels, the peripheral pixels include pixels on the edge of the image that in actuality did not exist (see 600c). In this case, the number of unnecessary pixels will respectively be one pixel in the vertical (main and sub-scanning) direction. Similarly, in the case of 5×5 pixels, the number of unnecessary pixels will respectively be two pixels in the vertical direction (see 600d). When the number of peripheral pixels in the main scanning direction that will be referenced is given as N, the number of unnecessary pixels that occur in the main scanning direction will thus be (N−1)/2 (pixels). In the First Embodiment described hereinafter, the case where N=7 and the number of unnecessary pixels that arise after image processing is 3 (pixels) will be described.

Next, the processes of dividing and transferring image data according to the First Embodiment will be described.

FIG. 7 illustrates a left-right division structure of image data. Reference numeral 700a denotes an original image. Since the DMAC 118 is presently optimized so as to transfer a rectangular image (32 pixels×32 pixels), the image data stored in the HDD 120 is divided into a plurality of rectangular images. Hereinafter, the rectangular images will be called tiles. Reference numeral 700b denotes image data divided into a plurality of tiles. Here, the divided image data can be transferred in arbitrary tile units. For example, consider the case of only transferring the left side of the image indicated by a shaded portion 701 in 700c. In 700d, reference numeral 702 denotes a tile from which to start the transfer. Reference numeral 703 denotes the number of tiles to be transferred in the main scanning direction, and reference numeral 704 denotes the number of tiles to be transferred in the sub-scanning direction. By setting these values in the DMAC 118, it is possible to transfer only the image data (tiles) of the image region 701 by DMA. This is also the case when transferring only the right side of the image indicated by an image region 705 shown in 700e. That is, by setting a tile 706 from which to start the transfer, the number of tiles 707 to be transferred in the main scanning direction, and the number of tiles 708 to be transferred in the sub-scanning direction in the DMAC 118, it is possible to DMA transfer only the tiles of the image region 705.

In the above configuration, the image regions 701 and 705 can be respectively set at the same time in the DMAC 118, in which case the DMAC 118 can transfer the tile images of each image region to the image processing LSIs alternately one at a time. For example, the tile images of the image region 701 and the tile images of the image region 705 can be alternately transferred respectively to the image processing LSI 202 and the image processing LSI 203 (see 700f).

Next, the method of dividing and transferring divided image data in the case of shifting image data in the main scanning direction will be described. In the case where a shift in the main scanning direction has been set by the user using the operation unit 122, the CPU 101 obtains information, such as the number of pixels to be shifted and the shift direction for executing the shift in the main scanning direction. The information designated by the user is assumed to have been a shift of 96 pixels (=3 tiles) and a shift to the right. Also, as discussed above, image processing referenced on a 7×7 pixel region is assumed to have been selected as image processing that results in unnecessary pixels. At this time, the CPU 101 sets the number of unnecessary pixels that will arise as a result of the image processing to 3 pixels.

Figure 8:
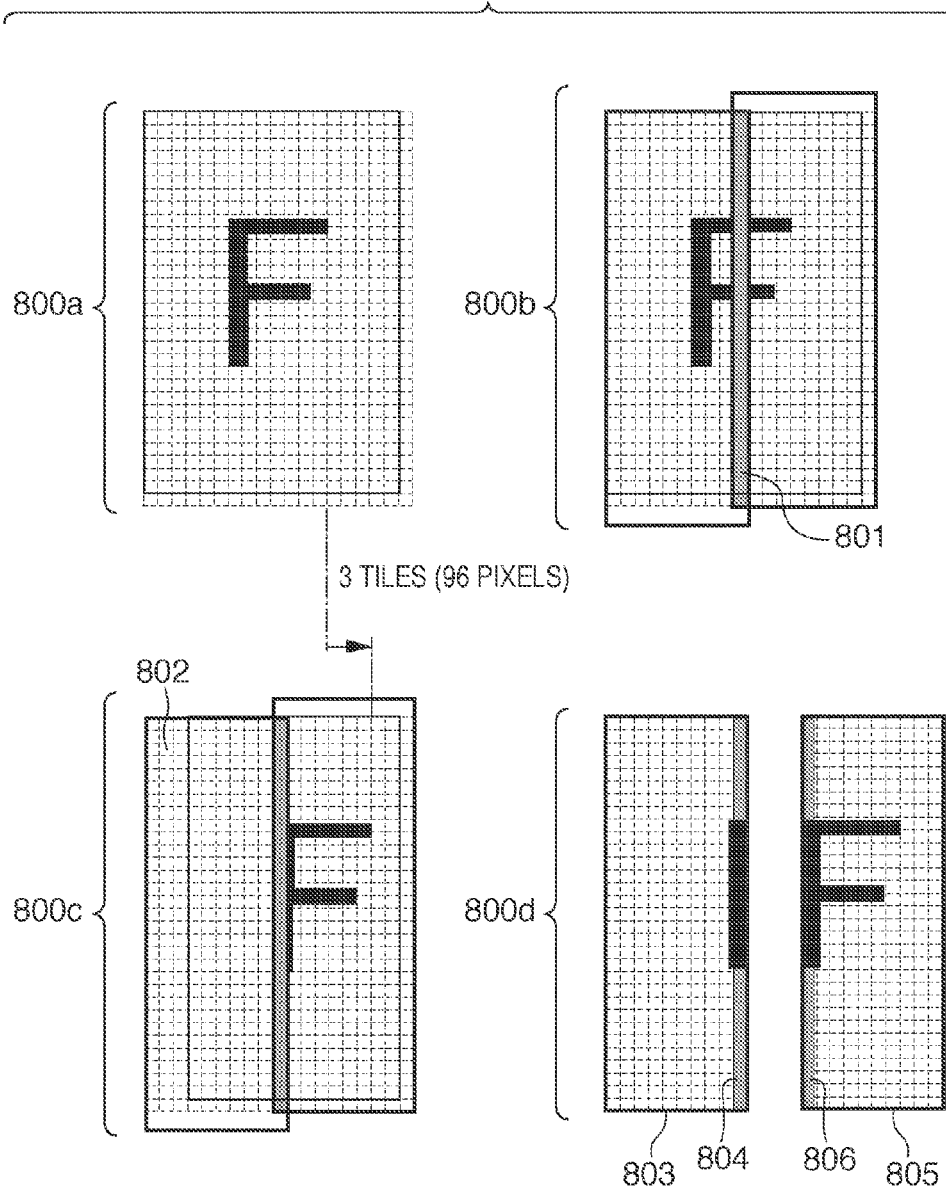
FIG. 8 illustrates an exemplary method of dividing an original image.

Next, the method of dividing an original image according to the First Embodiment will be described as follows using FIG. 8. Reference numeral 800a denotes an example in which an original image is divided into a plurality of tiles. Here, firstly, the case where the original image is divided without performing a shift in the main scanning direction is shown in 800b. In 800b, the left-side image and the right-side image are divided such that the left-side image shares an overlapping region 801 with the right-side image. This overlapping region 801 has an image width of one tile (32 pixels). This overlapping region 801 is used for deleting unnecessary pixels that arise due to image processing that will be discussed later.

Next, the division method in the case where 96 pixels (3 tiles) of image data are shifted in the main scanning direction will now be described. In the First Embodiment, when dividing original image data, the image is divided with consideration given in advance to the content of the shift in the main scanning direction. That is, when performing image division, image division is performed on image data that has been shifted. Reference numeral 800c denotes an image resulting from image data having been shifted in advance by 96 pixels (3 tiles) in the main scanning direction from the state of 800a. At this time, since 96 pixels equates to a width of three tiles, image division is assumed to have been performed in tile units on image data shifted in advance by a width of three tiles (96 pixels) in the main scanning direction. Also, three tiles of image data not in the original image will be required at this time on the left side of the left-side divided image. Three tiles of image data 802 are thus padded to create the left-side divided image. Similarly, three tiles of image data are deleted from the right-side of the right-side divided image, such that the right-side divided image is the same image size as the right-side divided image in 800b. Reference numeral 800d denotes the appearance of the image data thus divided into left and right halves. The following description will be given with reference to an overlapping region 804 of a left-side divided image 803 and an overlapping region 806 of a right-side divided image 805. The left-side divided image 803 and the right-side divided image 805 thus divided are respectively transferred to the image processing LSIs 202 and 203 by the DMAC 118 as a result of settings configured using software.

Figure 9:
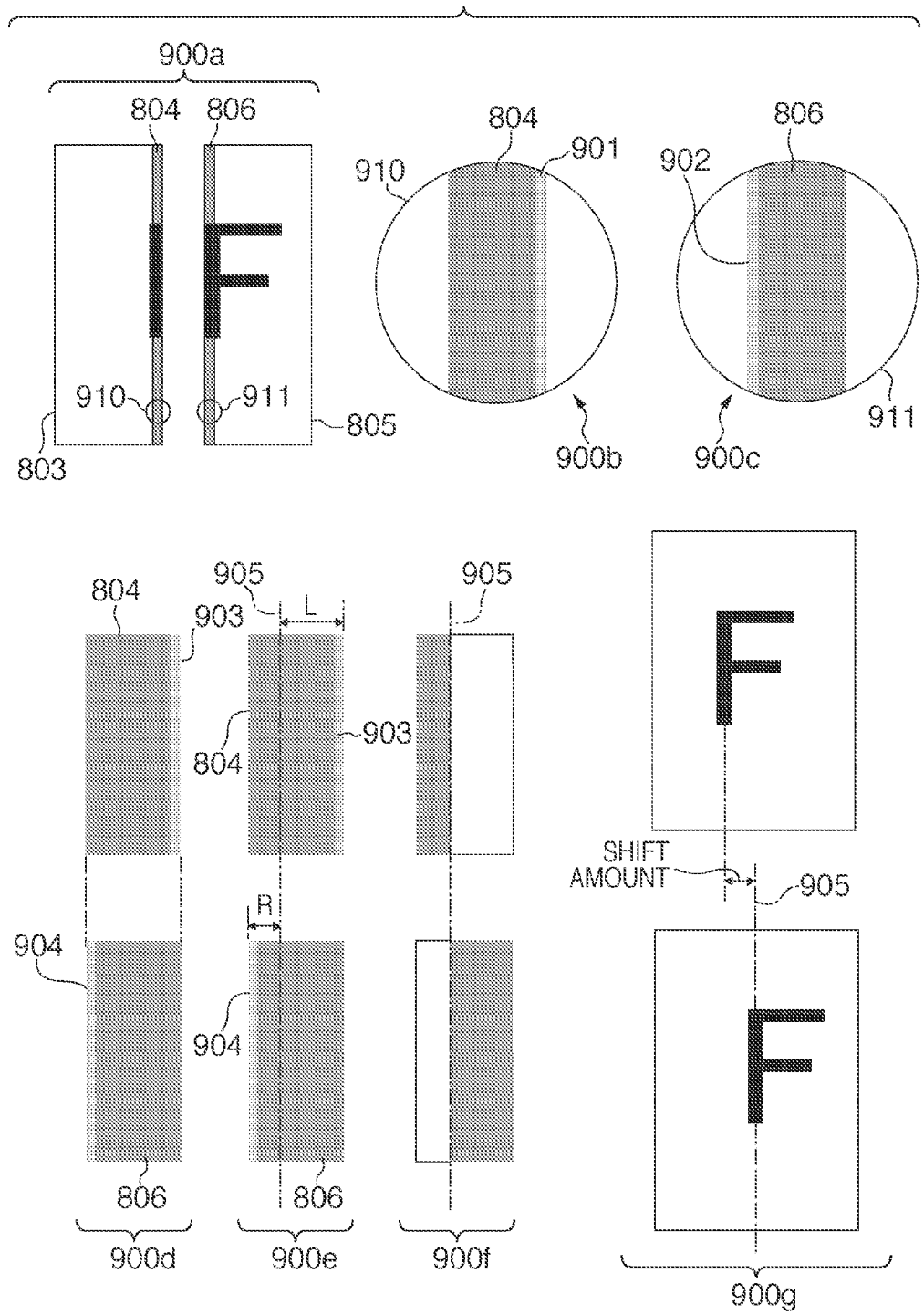
FIG. 9 illustrates an exemplary operation when combining divided images.

Next, an exemplary operation when combining divided images will be described with reference to FIG. 9. Reference numeral 900a denotes the same diagram as 800d but the tile division lines are removed to facilitate viewing. Reference numeral 900b denotes an enlarged view of a section 910 encircled in the overlapping region 804 of the left-side divided image 803. Similarly, reference numeral 900c denotes an enlarged view of a section 911 encircled in the overlapping region 806 of the right-side divided image 805. Reference numeral 901 denotes an unnecessary pixel region that arises on the right-side edge of the left-side divided image 803 due to image processing referenced on 7×7 peripheral pixels. Similarly, reference numeral 902 denotes an unnecessary pixel region that arises on the left-side edge of the right-side divided image 805 due to image processing referenced on 7×7 peripheral pixels. These unnecessary pixel regions also arise at the edges on the opposite side to the division boundaries, in addition to the positions denoted by 900b and 900c. However, since the description in the First Embodiment focuses on the unnecessary pixels that arise at the edges of the boundaries of the divided images, and the unnecessary pixels that arise on the opposite side to these division boundaries can be removed by different means, they will not be referred to below.

Here, the overlapping region 801 in 800b is in a middle section of the original image, and is equivalent to one tile common to the left and right-side divided images 803 and 805. In 900d, edge portions of the overlapping regions 804 and 806 of the left-side and right-side divided image 803 and 805 are extracted and enlarged. Focusing on the overlapping region 804, an unnecessary pixel region 903 exists at the right edge of the overlapping region 804, as shown here. Similarly, an unnecessary pixel region 904 exists at the left edge of the divided image 805. Also, since the width of the overlapping regions 804 and 806 in the main scanning direction is 32 pixels, prescribed pixels are respectively deleted from the left-side overlapping region 804 and the right-side overlapping region 806. In the case where divided images that have had pixels deleted are combined by the image combining LSI 204, which will be described below, the divided images can be combined without a surplus or deficiency of pixels.

This deletion method involves setting a division line 905 dividing the overlapping regions, as shown in 900e. Also, the number of pixels from the image edge portion of the right edge of the overlapping region 804 to the division line 905 is given as L, and the number of pixels from the image edge portion of the left edge of the overlapping region 806 to the division line 905 is given as R. The image data of the sections indicated by L and R is deleted (see 900f). A total of 32 pixels of data in the main scanning direction is thereby deleted from the overlapping regions 804 and 806. When the left and right divided images 803 and 805 are combined, the total width of the boundary region of these divided images 803 and 805 is 32 pixels (1 tile), enabling the combining to be performed without a surplus or deficiency of pixels. A relation represented by $$L+R=32 \tag{1}$$

holds between the number of pixels L deleted in the horizontal direction from the overlapping region 804 of the left-side divided image and the number of pixels R deleted in the horizontal direction from the overlapping region 806 of the right-side divided image.

Here, the ranges of values that L and R can take are:

$$3 \leq L \leq 29, \tag{2}$$

$$3 \leq R \leq 29. \tag{3}$$

The number of deleted pixels L of the left-side divided image and the number of deleted pixels R of the right-side divided image are thus set in advance in the image combining LSI 204 at values satisfying the above equations (1), (2) and (3) using software. This enables the correct image data to be generated, as shown in 900g, even in the case where image data that has been image processed by the image processing LSI 202 and the image processing LSI 203 is respectively received.

In the case of image processing referenced on 7×7 peripheral pixels, the ranges of values that L and R can take are represented by the aforementioned equations (2) and (3). However, in the case of referencing W×H peripheral pixels (W and H being odd numbers between 3 and 15 inclusive and not necessarily equal), the ranges of values that L and R can take will be represented by:

$$W \leq L \leq (32-W), \tag{4}$$

$$W \leq R \leq (32-W). \tag{5}$$

According to the First Embodiment as described above, in the case where image processing involving a shift of image data in the main scanning direction is performed in parallel with a plurality of image processing units, the image data to be processed by the image processing units is divided after the image data has been shifted. Processed image data corresponding to the original image data can thereby be obtained without needing a large-capacity image memory, by performing image processing on divided image data with separate image processing units, and combining the processed image data. In the First Embodiment, the case where original image data is divided into two (left and right) regions was described in order to simplify description, but the method described in the First Embodiment holds even if original image data is divided into a plurality of regions, such as four regions (2×2), for example. Four parallel image processing LSIs will be required in this case. In this case, performance is improved since image processing can be further parallelized, although cost increases since the number of image processing LSIs also increases. This is a matter of balancing performance and cost, and which configuration to employ can be appropriately selected by the designer.

In the aforementioned First Embodiment, the case was described where the number of pixels to be shifted when shifting in the main scanning direction is a multiple of tile size. In contrast, in a Second Embodiment, the case will be described where the number of pixels to be shifted takes an arbitrary value (the case where shifting is performed in units of 32 pixels (tile size) or less). A description will be provided assuming that the hardware configuration of a multifunction peripheral (MFP) serving as the image processing apparatus according to this Second Embodiment is the same as the multifunction peripheral (MFP) 100 serving as the image processing apparatus according to the First Embodiment except for the image processing LSIs 202 and 203.

Here, a description will be provided assuming that the number of pixels to be shifted is 120 pixels, and the shift direction is to the right (main scanning direction), as the shift in the main scanning direction set by the user using the operation unit 122. In this case, the DMAC 118 is set so as to perform image division on an image that has been shifted three tile images to the right side, given the value "3" constituting the integer part of 120/32, as shown in 800c. The DMAC 118 thereby respectively transfers image data divided after being shifted three tiles to the image processing LSIs 202 and 203, similarly to the aforementioned First Embodiment. The shift of 24 pixels constituting the remainder of 120/32 will be discussed later.

In the Second Embodiment, a shift of less than 32 pixels, which is the tile size, needs to be performed. To realize this, the shift of less than 32 pixels is performed in the image processing LSIs 202 and 203.

Figure 10:
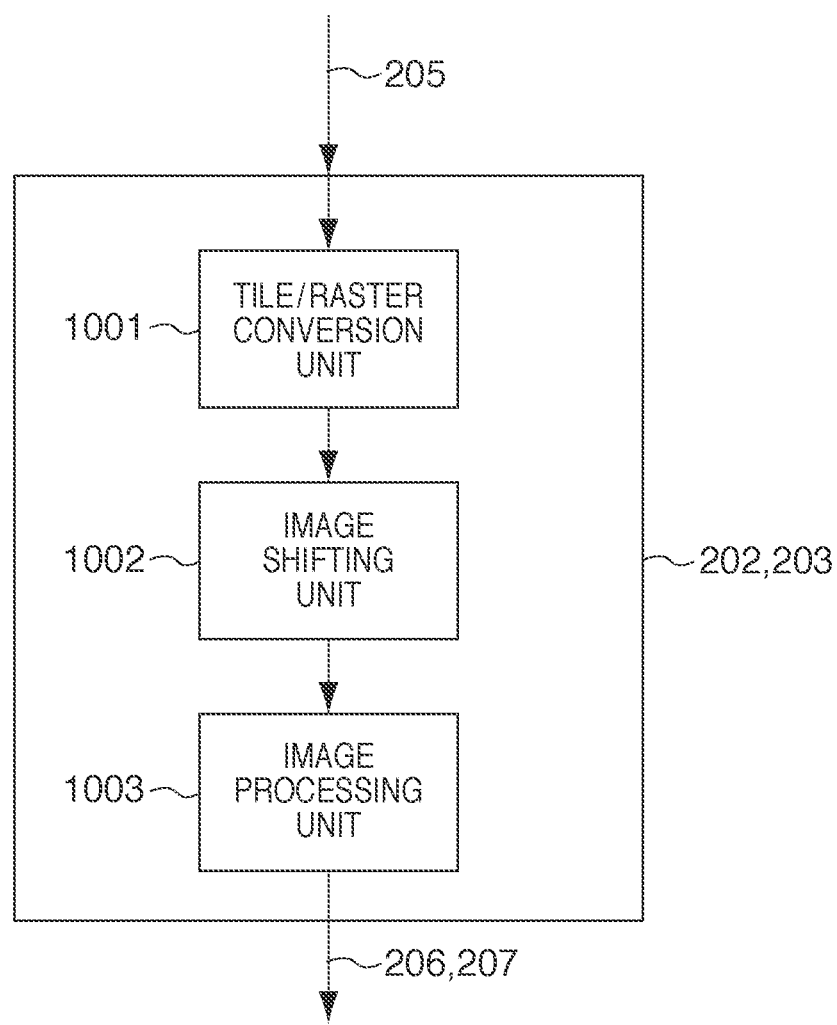
FIG. 10 is a block diagram showing an exemplary configuration of an image processing LSI according to another embodiment.

FIG. 10 is a block diagram showing an exemplary configuration of the image processing LSI 202 according to the Second Embodiment. The image processing LSI 203 also has a similar configuration to the image processing LSI 202. A tile/raster conversion unit 1001 receives tile image data obtained by image data stored in the HDD 120 being divided in tile units by the DMAC 118, and converts the tile image to a raster image. In the case where the tile image data has been compressed, the tile/raster conversion unit 1001 performs the raster conversion after performing decompression. An image shifting unit 1002 performs a shift of less than 32 pixels. In the Second Embodiment, since the shift amount in the main scanning direction set by the user using the operation unit 122 is 120 pixels, a shift of 24 pixels, which is the remainder of "120" divided by "32", is performed by this image shifting unit 1002. An image processing unit 1003 performs a variety of image processing including the image processing that refers 7×7 peripheral pixels described in the aforementioned First Embodiment. Image data that has undergone image processing by this image processing unit 1003 is output to the image data bus 206 or the image data bus 207.

Next, the method of shifting 24 pixels with the image shifting unit 1002 will be described. Here, shift information for 24 pixels, for example, is set in the image shifting unit 1002 of the image processing LSIs 202 and 203. Hereinafter, a shift in pixel units in the image processing LSIs 202 and 203 will be described using FIG. 11. Reference numeral 1100a denotes divided image data input to the image processing LSIs 202 and 203, and converted from tile images to raster images. Here, the divided image data has been divided into a left-side divided image 1101 and a right-side divided image 1102, and overlapping regions 1103 and 1104 of one tile image each have been provided. Reference numeral 1100b denotes an image that has been shifted 24 pixels to the right by the image shifting unit 1002. Reference numeral 1105 denotes the left-side divided image after having been shifted 24 pixels to the right by the image shifting unit 1002 of the image processing LSI 202. With this left-side divided image 1105, image data resulting from the image shift is eliminated at the right edge, since the image is shifted 24 pixels to the right (shaded part 1107 at the right edge of the left-side divided image 1105). Similarly, reference numeral 1106 denotes the right-side divided image after having been shifted 24 pixels to the right by the image shifting unit 1002 of the image processing LSI 203. With this right-side divided image 1106, image data resulting from the image shift is eliminated at the right edge, since the image is shifted 24 pixels to the right (shaded part 1107 at the right edge of the right-side divided image 1106).

Next, reference numeral 1100c denotes an enlarged view of a boundary section 1110 of the left-side divided image 1105, out of the images obtained after various image processing has been performed by the image processing units 1003 on the divided image data of 1100b that had been shifted in pixel units. Similarly, reference numeral 1100d denotes an enlarged view of a boundary section 1111 of the right-side divided image 1106.

In 1100c, reference numeral 1120 denotes an unnecessary pixel region that arises due to image processing that refers 7×7 peripheral pixels, out of the image processing executed on the left-side divided image 1105 by the image processing unit 1003. This unnecessary pixel region 1120 has a width of three pixels. Similarly, in 1100d, reference numeral 1121 denotes an unnecessary pixel region that arises due to image processing referenced on 7×7 peripheral pixels, out of the image processing executed on the right-side divided image 1106 by the image processing unit 1003. Here, the unnecessary pixel region 1121 also has a width of three pixels. In the case where these left and right divided images 1105 and 1106 are combined by the image combining LSI 204 without further processing, a desired image cannot be obtained since a 3-pixel unnecessary pixel region exists in both the boundary portion of the left-side divided image and the boundary portion of the right-side divided image. The image combining LSI 204 thus deletes these unnecessary pixel regions from the image data of these left and right divided images 1105 and 1106.

The method of deleting unnecessary pixels will be described with reference to 1100e and 1100g. Reference numeral 1100e denotes a diagram created for the left-side divided image 1105, based on 1100c. Reference numeral 1122 denotes an effective image section of the overlapping region 1103 of the left-side divided image 1105, other than the image section (3-pixel width) 1120 that is rendered unnecessary by the image processing. The pixel width of this section is 32−24−3=5 pixels.

Next, reference numeral 1100f denotes a diagram created for the right-side divided image 1106, based on 1100d. Reference numeral 1123 denotes an effective image section of the overlapping region 1104, excluding the image section (3-pixel width) 1121 that is rendered unnecessary by the image processing. The pixel width of this section is 32−3=29 pixels. Consequently, only the section denoted by 1122 is an effective image region in the overlapping region 1103 of the left-side divided image 1105, and only the section denoted by 1123 is an effective image region in the overlapping region 1104 of the right-side divided image 1106. Reference numeral 1100g denotes a state in which 1100e and 1100f have been enlarged, and both have further been arranged with consideration for their original positions in the original image data. As shown in 1100g, a region 1124 overlaps between the effective image region 1122 in the overlapping region 1103 of the left-side divided image 1101 and the effective image region 1123 in the overlapping region 1104 of the right-side divided image 1102. Since the pixel width of the effective image region 1122 in the overlapping region of the left-side divided image is five pixels, and the effective image region 1123 in the overlapping region of the right-side divided image is 29 pixels, the number of overlapping pixels of these effective image regions 1122 and 1123 will be 29+5−32=2 pixels. Accordingly, pixels equal to the number of pixels of this region 1124 are deleted, and the left-side divided image 1105 and the right-side divided image 1106 are combined. The boundary portions of the left and right divided images 1105 and 1106 can thereby be combined without a surplus or deficiency of pixels.

Here, with regard to the method of deleting pixels in overlapping regions, a relation represented by $$L+R=32-24=8 \tag{6}$$

holds, where L denotes the number of pixels deleted from the right edge of the unnecessary pixel region 1120 of the left-side divided image, and R denotes the number of pixels deleted from the left edge of the unnecessary pixel region 1121 of the right-side divided image. Here, "24" is the number of pixels deleted by the image shift in the main scanning direction.

Here, a relation $$L+R=32-S \tag{7}$$

generally holds, where S ($0 \leq S \leq 26$) is the number of pixels to be shifted.

The number of deleted pixels L of the left-side divided image and the number of deleted pixels R of the right-side divided image are set in advance in the image combining LSI 204 at values that satisfy the above equation (6) or (7) using software. Correct image data can thereby be generated, even if image data that has been image shifted and image processed by the image processing LSIs 202 and 203 is received from the respective image processing LSIs 202 and 203.

Furthermore, in the Second Embodiment, L+R=6 if S=26, which matches the sum of the number of pixels in the unnecessary pixel region 1120 of the left-side divided image and the number of pixels in the unnecessary pixel region 1121 of the right-side divided image. In this case, the number of pixels to be deleted will be L=R=3, and the maximum value of S will be "26".

As discussed above, even in the case of performing an image shift of 32 pixels or less, an image shift in the main scanning direction can be performed on divided data, by performing the image shift in pixel units within the image processing LSIs 202 and 203.

Furthermore, if the number of pixels to be shifted S=0, the number of pixels to be shifted in the image shifting units 1002 of the image processing LSIs 202 and 203 will be "0". This means that an image shift in pixel units is thus not performed by the image shifting units 1002 of the image processing LSIs 202 and 203. Therefore, the processing is the same as that described in the aforementioned First Embodiment.

In the Second Embodiment, since the case of image processing referenced on 7×7 peripheral pixels was described, the relation of L and R will be as represented by equation (7). However, the number of pixels to be shifted S in equation (7) will be $$0 \leq S \leq \{32-(W-1)\}$$

in the case of referencing W×H peripheral pixels (W and H being odd numbers between 3 and 33 inclusive, and not necessarily equal).

In addition to the effect of the aforementioned First Embodiment, the Second Embodiment as described above enables an image shift to be executed not only in the case of a shift in tile units but even if the shift amount includes a fractional number smaller than the tile size.

In the aforementioned First Embodiment, the case was described where the number of pixels to be shifted when performing an image shift in the main scanning direction is a multiple of tile size. In the aforementioned Second Embodiment, the case was described where the fractional number of the pixels to be shifted when performing an image shift in the main scanning direction is from 1 to 26. In a Third Embodiment, the case will be described where the fractional number of the pixels to be shifted is from 27 to 31.

Here, it is assumed that, as the content of the image shift in the main scanning direction set by the user from the operation unit 122, the number of pixels to be shifted is 126 pixels and the shift direction is to the right. In this case, the number of pixels to be shifted will be 30 pixels, which is the remainder of 126/32.

Figure 11:
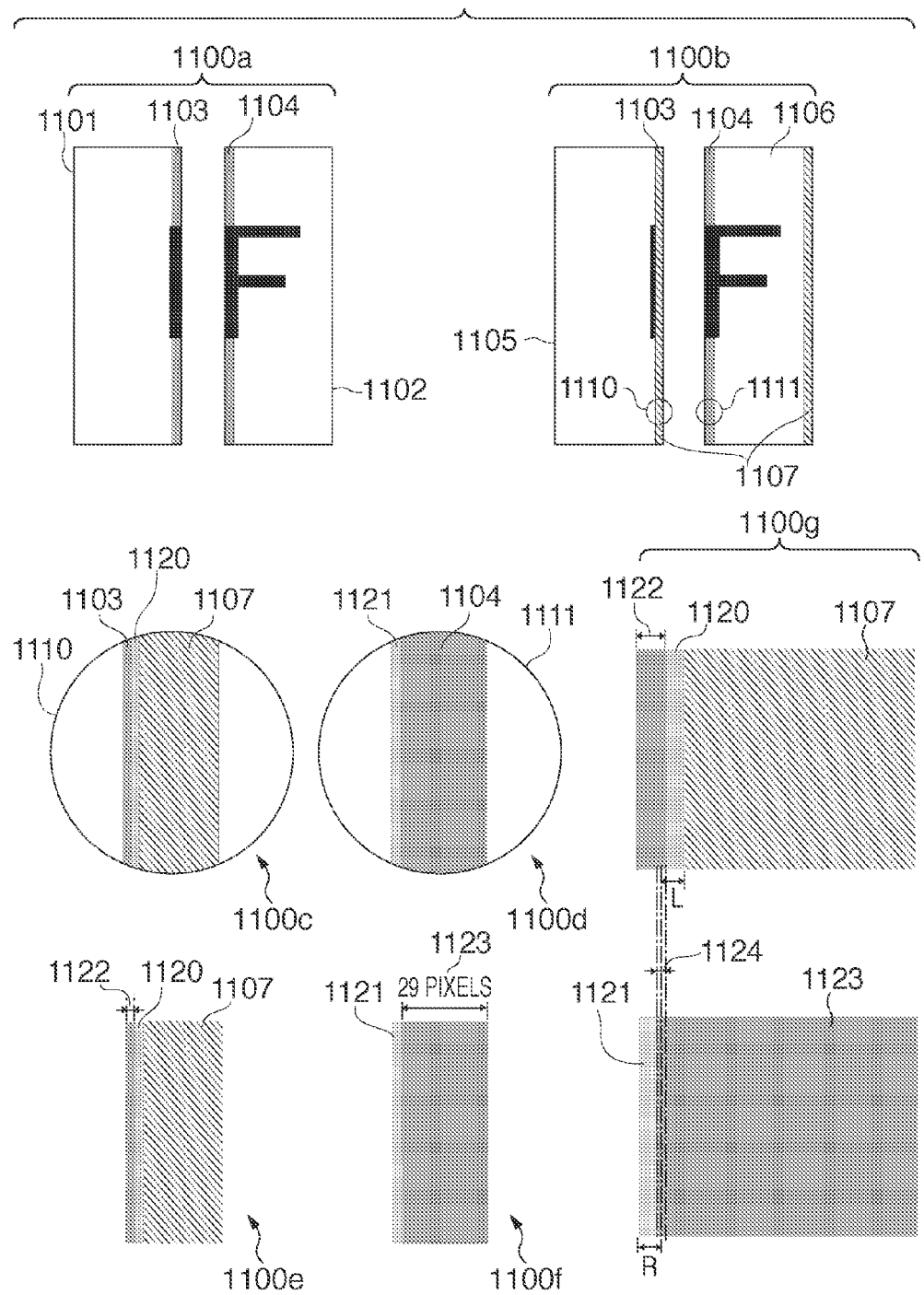
FIG. 11 illustrates an exemplary shift in pixel units by the image processing LSIs according to another embodiment.

In this case, a problem arises in that there is no longer an effective image portion in the overlapping region 1103 when image division is performed after providing an image that has been shifted three tiles to the right side given that 126/32=3 with an overlapping region of one tile image, similarly to that described with FIG. 11. This will be described using FIG. 12.

Reference numeral 1200a, similarly to FIG. 11, denotes a diagram in which image data obtained by shifting an original image three tiles is divided, and a shift of a fractional number of 30 pixels has further been performed by the image processing LSIs 202 and 203.

Reference numeral 1201 denotes a left-side divided image that has been shifted 30 pixels to the right by the image shifting unit 1002 of the image processing LSI 202, and further been image processed by the image processing unit 1003. Similarly, reference numeral 1202 denotes a right-side divided image that has been shifted 30 pixels to the right by the image shifting unit 1002 of the image processing LSI 203, and further been image processed by the image processing unit 1003. Shaded regions 1203 are eliminated image regions that arise because of image data being shifted 30 pixels in the main scanning direction, with the width of these regions being 30 pixels.

Reference numeral 1200b is an expanded view of a boundary section 1210 of the left-side divided image. Reference numeral 1204 denotes an unnecessary pixel region that arises due to image processing by the image processing unit 1003 of the image processing LSI 202. Similarly, reference numeral 1200c is an expanded view of a boundary section 1211 of the right-side divided image 1202. Reference numeral 1206 denotes an unnecessary pixel region that arises due to image processing by the image processing unit 1003 of the image processing LSI 203. Focusing on 1200b, the pixel width of the eliminated image region 1203 resulting from the image shift in pixel units is 30 pixels, and the pixel width of the unnecessary pixel region 1204 resulting from image processing is three pixels. The entire overlapping region 1103 of the left-side divided image 1201 is thus clearly unusable. Also, reference numeral 1205 denotes a region excluding the pixels of the eliminated image region 1203 resulting from the image shift in pixel units from the overlapping region 1103 of the left-side divided image, the pixel width of this region being 32−30=2. Also, 2−3=−1 given that the unnecessary pixel region 1204 resulting from image processing is three pixels, and thus image data beyond this overlapping region 1103 will also be ineffective. In 1200b, part of the unnecessary pixel region 1204 is left blank in order to clearly show the region 1205.

Also, according to 1200c, the pixel width of the effective overlapping region will be 32−3=29, since the pixel width of the unnecessary pixel region 1206 resulting from image processing in the overlapping region 1104 of the right-side divided image 1202 is three pixels.

Figure 13:
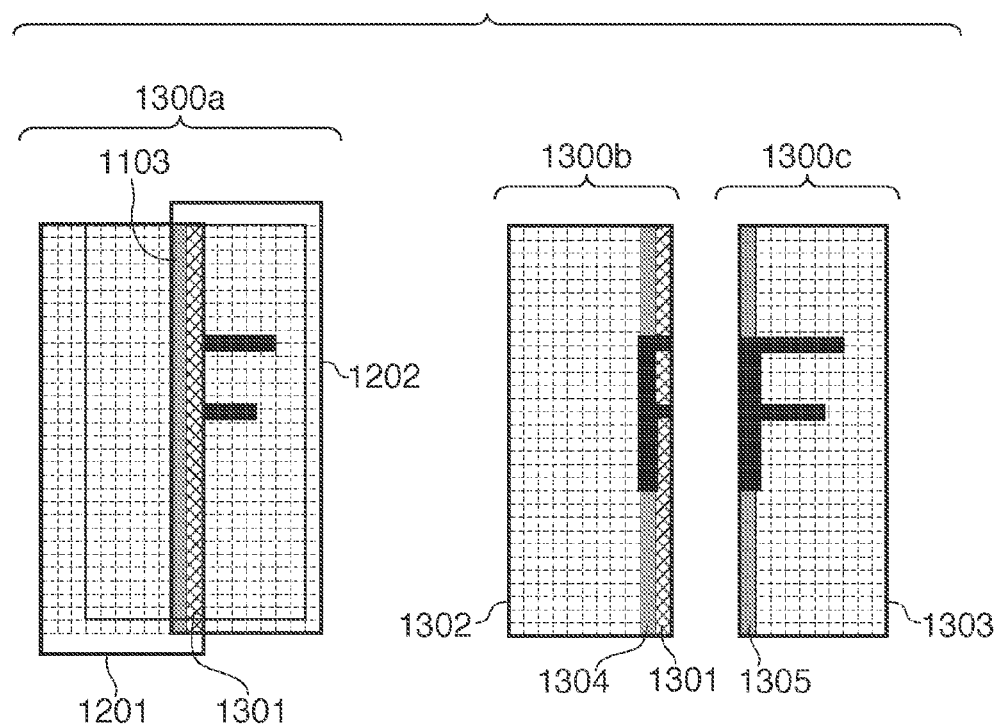
FIG. 13 illustrates an exemplary method of dividing image data according to another embodiment.

Consequently, in the Third Embodiment, desired image data cannot be obtained with an image data division method such as discussed above. In view of this, an image data division method shown in FIG. 13 is performed in the Third Embodiment.

In the case where a shift of 30 pixels is performed in the main scanning direction as illustrated in FIG. 12, the entire overlapping region 1103 in the left-side divided image 1201 will be rendered ineffective. An additional image region 1301 of one more tile is thus further added to the right side of the overlapping region 1103, in the division of the left-side divided image 1201, as shown in 1300a.

In 1300b and 1300c, reference numeral 1302 denotes the left-side divided image and reference numeral 1303 denotes the right-side divided image. Reference numeral 1304 denotes the overlapping region of the left-side divided image, and reference numeral 1305 denotes the overlapping region of the right-side divided image. Reference numeral 1300b denotes the left-side divided image that has been divided by the above division method, and reference numeral 1300c denotes the right-side divided image that has been divided by the above division method.

Figure 14:
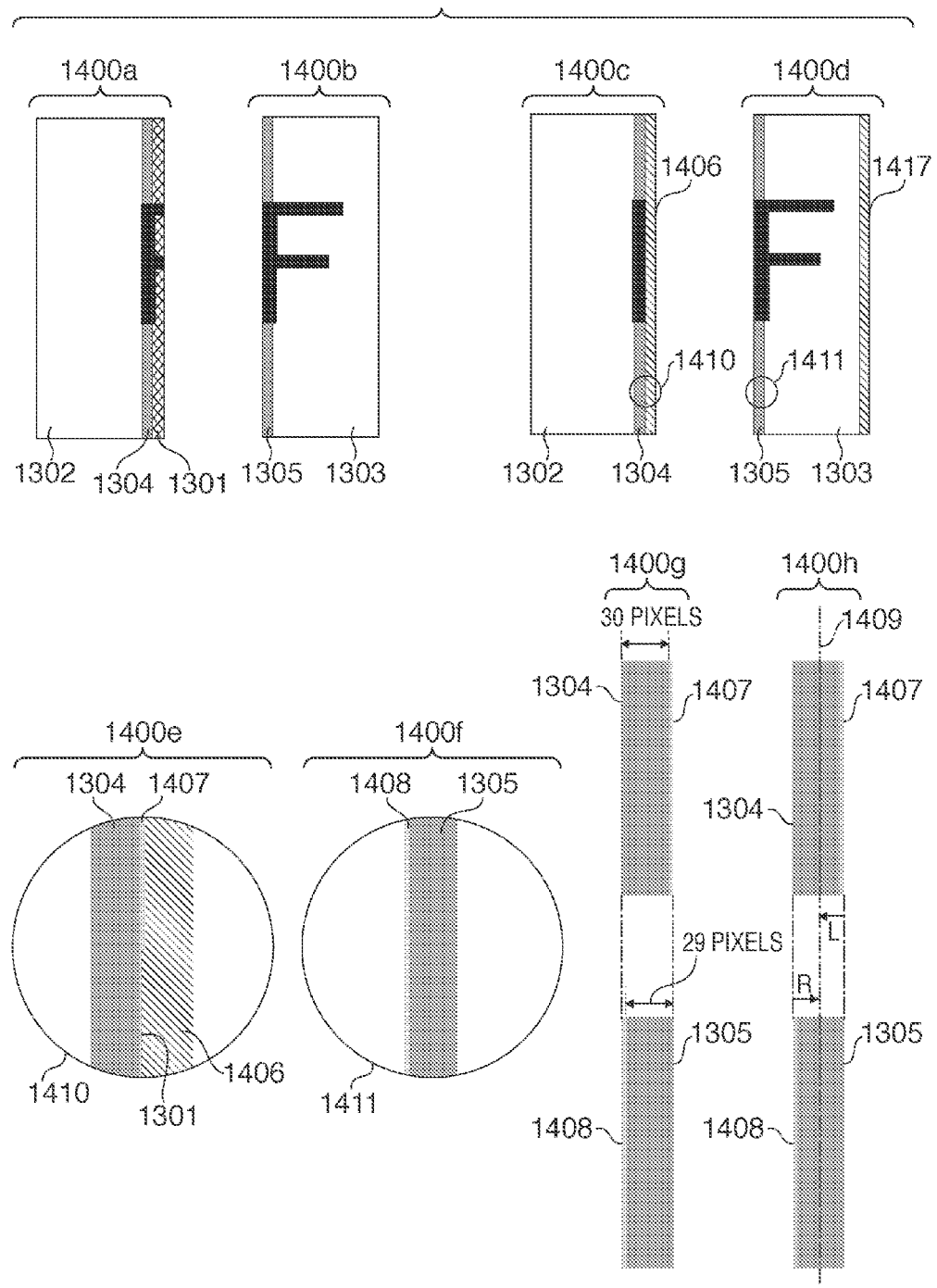
FIG. 14 illustrates an example in which a shift in pixel units is performed on divided images in another embodiment.

Next, the case where, similarly to the description in FIG. 12, a 30 pixel image shift is performed on the divided images that have been divided with the division method illustrated in FIG. 13 will be described, with reference to FIG. 14. Reference numeral 1400a and 1400b are the same diagrams as 1300b and 1300c, but the tile division lines are removed to facilitate viewing.

Next, the left-side divided image 1302 is shifted 30 pixels to the right by the image shifting unit 1002 of the image processing LSI 202, and is further image processed by the image processing unit 1003. Reference numeral 1400c shows the left-side divided image data at this time. Reference numeral 1406 denotes an eliminated image region when a 30-pixel image shift has been performed. Reference numeral 1400d denotes a right-side divided image obtained when the right-side divided image 1303 has similarly been image shifted 30 pixels to the right by the image shifting unit 1002 of the image processing LSI 203, and has further been image processed by the image processing unit 1003. Reference numeral 1417 denotes an eliminated image region when a 30-pixel image shift has been performed.

Reference numeral 1400e denotes an enlarged view of a division boundary part 1410 of the left-side divided image 1302 in 1400c, and 1400f shows an enlarged view of a division boundary unit 1411 of the right-side divided image 1303 in 1400d. In 1400e, reference numeral 1407 denotes an unnecessary pixel region that arises when image processing is performed by the image processing unit 1003, with the pixel width this region being "3". The unnecessary pixel region 1407 has been partly omitted to facilitate viewing of the additional image region 1301. Also, the additional image region 1301 originally had a 32-pixel width, but now has a 2-pixel width because of being image shifted 30 pixels in the main scanning direction by the image shifting unit 1002. Consequently, the entire additional image region 1301 is rendered unusable due to the image shift and to the deletion of unnecessary pixels resulting from image processing. Further, a single pixel on the far right side of the overlapping region 1304 is unnecessary image data, leaving only a 31-pixel width as effective image data. In 1400f, reference numeral 1408 denotes an unnecessary pixel region that arises when image processing is performed by the image processing unit 1003, with the pixel width being "3". Therefore, the three pixels on the left side of the overlapping region 1305 constitute an unnecessary pixel region, with the remaining 29 pixels being effective image data.

Next, the upper side of 1400g results from extracting only the overlapping image data portion of 1400e, and the lower side of 1400g results from extracting only the overlapping image data portion of 1400f. Based on this, the effective pixel width of the overlapping region 1304 of the left-side divided image 1302 is 30 pixels, and the effective pixel width of the overlapping region 1305 of the right-side divided image 1303 is 29 pixels. Therefore, an arbitrary overlapping region division line 1409 is set for the overlapping regions of the left and right divided images, as shown in 1400h. Also, L denotes the number of pixels from the image edge to the division line 1409 relative to the overlapping region 1304 of the left-side divided image, and R denotes the number of pixels from the image edge to the division line 1409 relative to the overlapping region 1305 of the right-side divided image. Deleting the image data of the sections indicated by L and R enables the boundary portions of these overlapping regions 1304 and 1305 to be combined without a surplus or deficiency of pixels, since the pixel width that results from combining these overlapping regions 1304 and 1305 will be 32 pixels. At this time, a relation represented by $$L+R=32+32-30 \quad (8)$$

holds between the number of deleted pixels L of the left-side divided image 1302 and the number of deleted pixels R of the right-side divided image 1303 ("30" being the number of pixels to be shifted).

$$L+R=32+32-S, \quad (9)$$

where S (27≦S≦31) is the number of pixels to be shifted.

The number of deleted pixels L of the left-side divided image and the number of deleted pixels R of the right-side divided image are set in advance in the image combining LSI 204 at values that satisfy the above equation (8) or (9) using software. This enables correct image data to be generated, even if image data that has been image shifted and image processed by the image processing LSIs 202 and 203 is received from the respective image processing LSIs 202 and 203.

Furthermore, since the Third Embodiment was described in the case of image processing referenced on 7×7 peripheral pixels, the relation of S with L and R will be as represented by equation (9). However, the range of the number of pixels to be shifted S in equation (9) will be $$32-W+2 \leq S \leq 31$$

in the case of referencing W×H peripheral pixels (W and H being odd numbers between 3 and 33 inclusive, and not necessarily equal).

The Third Embodiment was described with the image shift direction being to the right, but similar processing is possible even if the image shift direction is to the left. In this case, a lack of image data in the division boundary portion can be prevented by adding the additional image region 1301 to the left edge of the left-side divided image 1302 rather than the right edge, when dividing the image data illustrated in FIG. 13.

Furthermore, the Third Embodiment was described in terms of an additional image region being added to the left-side divided image in the case of the image shift direction being to the right, but an additional image region may be added to the right-side divided image. In either case, an additional image region needs to be added so as to compensate for the data of overlapping regions that is erased by an image shift in pixel units and rendered ineffective by unnecessary pixels that arise due to image processing.

As described above, the Second and Third Embodiments enable desired image data to be obtained without needing a large image memory as was the case with conventional techniques, even in the case where an original image is divided and an image shift is performed by an arbitrary number of pixels.

As described above, the First to Third Embodiments enable an image shift to be performed if an original image is divided in any of the cases. The present embodiments enable a desired image shift in the main scanning direction to be performed in each of the cases, by combining divided data after changing the image data division method according to the image shift amount/shift direction and the image processing content, and deleting unnecessary image data.

Figure 15:
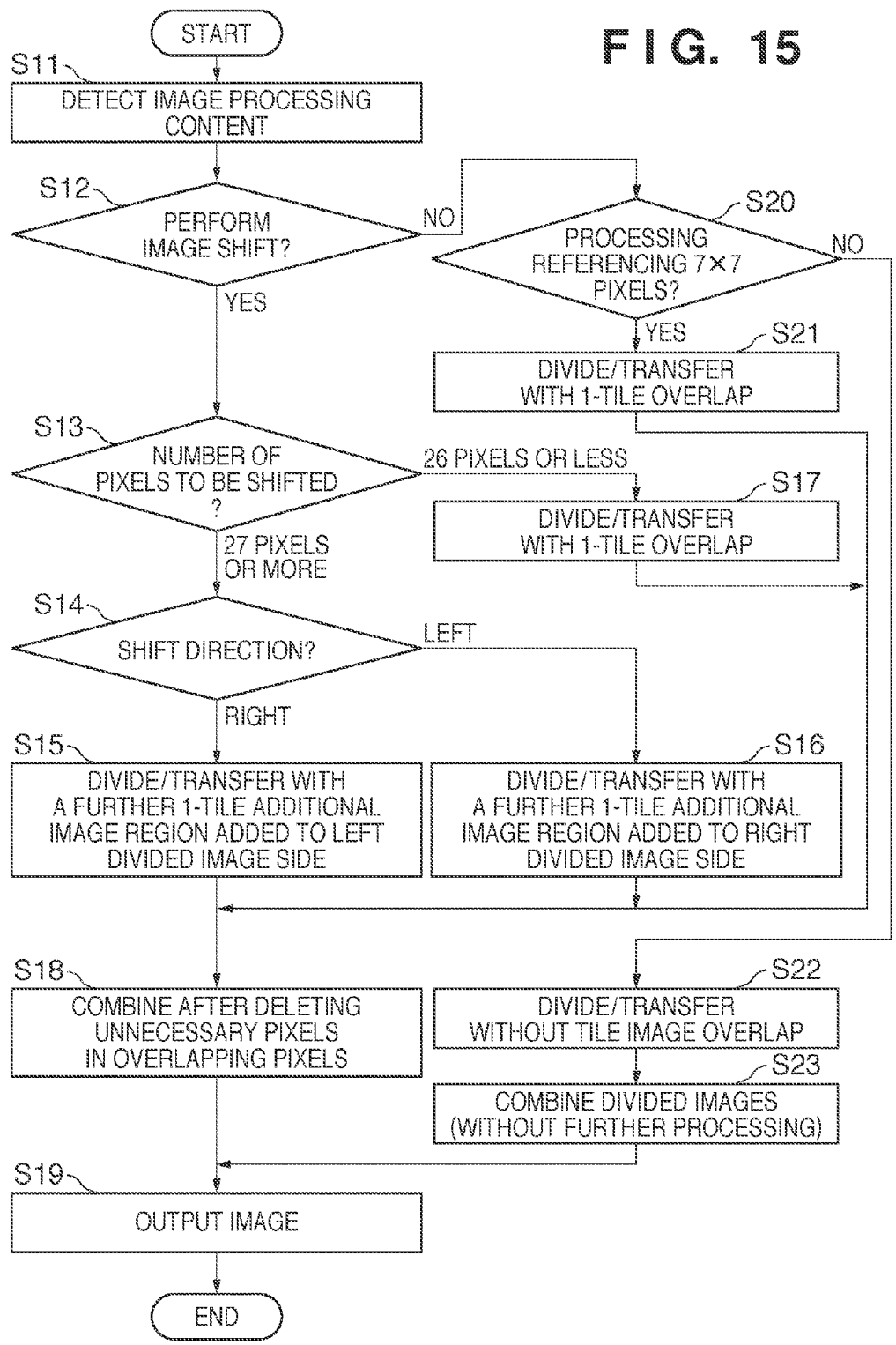
FIG. 15 is a flowchart illustrating exemplary processing by an image processing apparatus according to the embodiments.

FIG. 15 is a flowchart illustrating exemplary processing by an image processing apparatus according to the present embodiments. A program for executing this processing is installed in the HDD 120, and then loaded from the HDD 120 into the RAM 103 when starting the processing, and executed under the control of the CPU 101.

Firstly, at S11, the CPU 101 detects the instructed content of image processing. This is based on setting information input by the user to the operation unit 122, and in the present embodiments, the number of pixels to be shifted, the image shift direction, and whether or not performing image processing that refers 7×7 reference pixels are set. Next, the processing proceeds to S12, where the CPU 101 determines whether an image shift is set in the setting information input at S11. When it is determined that an image shift is set ("YES" at S12), the processing proceeds to S13, where the CPU 101 determines the set number of pixels to be shifted. Here, the case where the shift amount is in tile units is omitted. If it is determined that the number of pixels to be image shifted in the case where the shift amount is in pixel units is 26 pixels or less ("26 PIXELS OR LESS" at S13), the processing proceeds to S17, where the CPU 101 sets the DMAC 118 so as to perform division to include overlapping regions of 1-tile width, as described in the Second Embodiment.

Although not shown in this flowchart, the divided images in practice differ depending on the image shift direction. Reference numeral 1600a denotes an example in the case of performing an image shift to the right, and 1600b denotes an example in the case of performing an image shift to the left. Image data thus divided into left and right sides is transferred to the image processing LSIs 202 and 203 and the image combining LSI 204, and image shifting, various image processing, deletion of unnecessary image data, and combining of divided image data are performed to obtain processed image data. Image data thus obtained is transferred to the printer 108 at S19 and printed. If the number of pixels to be image shifted in pixel units is "0", an image shift in pixel units is not performed by the image shifting unit 1002 of the image processing LSIs 202 and 203 as described in the First Embodiment.

On the other hand, if it is determined that the number of pixels to be image shifted in pixel units is 27 pixels or more at S13 ("27 PIXELS OR MORE" at S13), the processing proceeds to S14, where the CPU 101 determines whether the shift direction is to the left or right. If it is determined that the shift direction is to the right ("RIGHT" at S14), the processing proceeds to S15. At S15, the CPU 101 sets the DMAC 118 so as to divide and transfer original image data such that an additional image region of 1-tile image width is further added to the image edge of the right-side divided image, as described in the Third Embodiment (see 1600c). The divided image data thereby transferred is similarly combined after having unnecessary image data deleted at S18, and is printed at S19. If it is determined at S14 that the shift direction is to the left ("LEFT" at S14), processing proceeds to S16. At S16, the CPU 101 sets the DMAC 118 to divide and transfer the original image data such that an additional image region of 1-tile image width is further added to the image edge of the left-side divided image (see 1600d). The divided image data thus transferred is combined after having unnecessary image data deleted at S18, and is printed at S19.

Next, if it is determined at S12 that an image shift is not included ("NO" at S12), the processing proceeds to S20, where the CPU 101 determines whether the setting information includes image processing that refers a 7×7 pixel region. Here, if it is determined that image processing that refers a 7×7 pixel region is included ("YES" at S20), the processing proceeds to S21, where the CPU 101 sets the DMAC 118 so as to perform division to include overlapping regions of 1-tile width (see 1600e). The processing then proceeds to S18, where divided image data that has been divided and transferred according to setting configured by the CPU 101 is printed at S19 after having unnecessary image data deleted by the image combining LSI 204.

On the other hand, if it is determined at S20 that image processing that refers a 7×7 pixel region is not included ("NO" at S20), the processing proceeds to S22, where the CPU 101 sets the DMAC 118 so as to perform division to not include overlapping regions (see 1600f). Next, the processing proceeds to S23, where the CPU 101 simply combines the divided image data in the image combining LSI 204 without performing deletion since there is no unnecessary image data in the boundary portions of the divided image data. The processing proceeds to S19, where the combined image data is printed.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-277038, filed Dec. 4, 2009, which is hereby incorporated by reference herein in its entirety.

What is claimed is:

1. An image processing apparatus comprising:
a storage unit configured to store original image data;
a readout unit configured to read out the original image data from the storage unit, while dividing the original image data into a plurality of divided image data;
a plurality of image processing units configured to perform image processing on the plurality of divided image data to generate a plurality of processed image data;
an image combining unit configured to combine the plurality of processed image data to generate combined image data;
an output unit configured to output the combined image data; and
a control unit configured to, if the original image data is needed to be shifted, control the readout unit to read out the original image data to include an overlapping region such that the plurality of divided image data partially overlap each other, and control the image combining unit to delete an unnecessary pixel according to the shift, and, if the original image data is not needed to be shifted, control the readout unit to read out the original image data not to include the overlapping region, and control the image combining unit not to delete the unnecessary pixel.

2. The apparatus according to claim 1,
wherein the image processing includes image processing requiring a plurality of reference pixels in a main scanning direction.

3. The apparatus according to claim 1,
wherein the read out unit is further configured to read out the image data in blocks obtained by dividing the image data into blocks, and a width of the overlapping region equals a width of each block.

4. The apparatus according to claim 3,
wherein the image combining unit is further configured to delete the unnecessary pixel such that, when the overlapping regions of the plurality of processed image data processed by the plurality of image processing units are combined, a total width of the overlapping regions equals the block width.

5. A control method of an image processing apparatus comprising:
reading out original image data from a memory storing the original image data, while dividing the original image data into a plurality of divided image data;
performing image processing on the plurality of divided image data to generate a plurality of processed image data;
combining the plurality of processed image data to generate combined image data; and
outputting the combined image data, wherein
if the original image data is needed to be shifted, the original image data is read out to include an overlapping region such that the plurality of divided image data partially overlap each other, and an unnecessary pixel is deleted according to the shift; and
if the original image data is not needed to be shifted, the original image data is read out not to include the overlapping region, and the unnecessary pixel is not deleted.

6. The method according to claim 5,
wherein the image processing includes image processing requiring a plurality of reference pixels in a main scanning direction.

7. The method according to claim 5,
wherein the reading out includes reading out the image data in blocks obtained by dividing the image data into blocks, and a width of the overlapping region equals a width of each block.

8. The method according to claim 7,
wherein the combining includes deleting the unnecessary pixel such that, when the overlapping regions of the plurality of processed image data are combined, a total width of the overlapping regions equals the block width.

* * * * *